United States Patent
Tan et al.

(10) Patent No.: US 10,430,473 B2
(45) Date of Patent: Oct. 1, 2019

(54) DEEP MINING OF NETWORK RESOURCE REFERENCES

(71) Applicant: Microsoft Technology Licensing, LLC, Redmond, WA (US)

(72) Inventors: Ming Tan, Bellevue, WA (US); Like Liu, Redmond, WA (US); Qiong Ou, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 386 days.

(21) Appl. No.: 15/003,771

(22) Filed: Jan. 21, 2016

(65) Prior Publication Data

US 2016/0267183 A1 Sep. 15, 2016

Related U.S. Application Data

(60) Provisional application No. 62/130,577, filed on Mar. 9, 2015.

(51) Int. Cl.
*G06F 17/30* (2006.01)
*G06F 16/951* (2019.01)
*G06N 20/00* (2019.01)

(52) U.S. Cl.
CPC ........... *G06F 16/951* (2019.01); *G06N 20/00* (2019.01)

(58) Field of Classification Search
CPC ................................................ G06F 17/30864
See application file for complete search history.

(56) References Cited

U.S. PATENT DOCUMENTS

| 7,072,890 | B2 | 7/2006 | Salerno et al. |
| 7,610,267 | B2 | 10/2009 | Kulkarni et al. |
| 7,698,442 | B1 | 4/2010 | Krishnamurthy et al. |
| 7,853,719 | B1 | 12/2010 | Cao et al. |
| 8,065,300 | B2 | 11/2011 | Gupta et al. |
| 8,244,577 | B2 | 8/2012 | Gupta et al. |
| 8,290,945 | B2 | 10/2012 | Chellapilla et al. |
| 2007/0208730 | A1 | 9/2007 | Agichtein et al. |

(Continued)

FOREIGN PATENT DOCUMENTS

CN 102752154 A 10/2012

OTHER PUBLICATIONS

Fu, et al., "Mining Navigation History for Recommendation", In Proceedings of the 5th international conference on Intelligent user interfaces, Jan. 9, 2000, 7 pages.

(Continued)

*Primary Examiner* — Hung Q Pham

(57) ABSTRACT

Architecture for deep mining of network resource references such as URLs. The architecture includes an extraction component configured to extract useful entity information from a collection of entity information, the collection of entity information derived from local search data; a distributed processing component configured to distributively query a search engine using the useful entity information and receive search results from the search engine, the search results comprising resource references; and, a selection component configured to remove non-relevant resource references to obtain candidate resource references and select a top resource reference from the candidate resource references, using an unsupervised machine learning algorithm.

20 Claims, 6 Drawing Sheets

(56) References Cited

U.S. PATENT DOCUMENTS

2011/0072002 A1 3/2011 Kirkby et al.
2011/0178868 A1* 7/2011 Garg ................ G06F 17/30864
　　　　　　　　　　　　　　　　　　　　　　705/14.45

OTHER PUBLICATIONS

Guo, et al., "A Large Scale URL Verification Pipeline Using Hadoop", In Proceedings of 11th IEEE International Conference on Data Mining Workshops, Dec. 11, 2011, 8 pages.
Joachims, Thorsten, "Optimizing Search Engines Using Clickthrough Data", In Proceedings of the eighth ACM SIGKDD international conference on Knowledge discovery and data mining, Jul. 23, 2002, 10 pages.
Varlamis, Iraklis, "THESUS, a Closer View on Web Content Management Enhanced with Link Semantics", In IEEE Transactions on Knowledge and Data Engineering, vol. 16, No. 6, Jun. 2004, 16 pages.
Armstrong, et al., "WebWatcher: A Learning Apprentice for the World Wide Web", In Proceedings of the AAAI Spring Symposium on Information Gathering from Heterogeneous, Distributed Environments, Mar. 1995, 7 pages.
Varlamis, et al., "Web Document Searching Using Enhanced Hyperlink Semantics Based on XML", In Proceedings of International Symposium on Database Engineering and Applications, Jul. 16, 2001, 11 pages.
Jain, et al. "Open Entity Extraction from Web Search Query Logs", In Proceedings of the 23rd International Conference on Computational Linguistics, Aug. 23, 2010, 9 pages.
Zhang et al. "Mining Search Engine Query Logs for Query Recommendation", In Proceedings of the 15th international conference on World Wide Web, May 22, 2006, 2 pages.

* cited by examiner

DEEP MINING OF NETWORK RESOURCE REFERENCES

CROSS-REFERENCE TO RELATED APPLICATIONS

This application claims the benefit of U.S. Provisional Patent Application Ser. No. 62/130,577 entitled "DEEP MINING OF NETWORK RESOURCE REFERENCES" and filed Mar. 9, 2015, the entirety of which is incorporated by reference herein.

BACKGROUND

Network resource references, which include URLs (uniform resource locators), are useful attributes in local search regimes for entities such as businesses, points of interest, etc. The resource reference provides an improved user experience to users who browse additional information about the resource (e.g., a business entity) by simple clicking on the business entity website. The resource reference also helps the local search relevance aspects of search, since more entity click streams can be mined from logs and entity meta-streams from the web, in terms of URLs, for example. However, existing resource reference (e.g., URLs) coverage and the precision of business entities in local search are inadequate.

SUMMARY

The following presents a simplified summary in order to provide a basic understanding of some novel implementations described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides an unsupervised machine learning algorithm to filter and select resource references (e.g., URI (uniform resource identifiers) such as URLs (uniform resource locators)), and a scraping method (send request, receive and store results) that utilizes the web search engine or multiple search engines. Unsupervised machine learning operates on unlabeled (training) data to infer a function that describes a hidden structure, in contrast to supervised machine learning that operates on labeled training data from which to infer the function. The architecture comprises two main steps in implementation. In the first main step, a first act, published data from a local search pipeline is used as input to the URL mining pipeline. Although described in some cases herein in the context of URLs, it is to be appreciated that the description applies generally to resource references such as URIs.

In a second following act, preprocessing extracts useful entity information (e.g., attributes), which is used in a "scraping" process. Useful entity information includes relevant local (of a geographical area such as a city, park, event, etc.) entity names, variations on the names, etc., and entity attributes. Entity attributes can include category of the entity (e.g., restaurant, barber, etc.), address of the entity, geo-coordinates (e.g., latitude/longitude), hours/days of operation, and so on.

If there are multiple tokens in the business name, queries can be constructed using name variations of token combinations. This variety of business entity names and attributes can then be submitted as queries to one or more search engines (a distributed query operation for multiple search engines).

In a third act of this first step, scraping (sending a request (a query) to the search engine, receiving a result back, and then storing the result somewhere) is employed using a distributed scraping component (distributed, in that scraping is performed against multiple search engines and indices). The distributed scraping component sends entity information as a query to the search engine, and, parses and saves the engine response as features (scraping results) to be used in a URL mining algorithm.

In the second main step, a first act mines business entity URLs from the above scraping results using an unsupervised machine learning algorithm. Heuristic filtering rules are initially applied to filter out invalid URLs. The filtering rules can comprise: accepting (Accept) based on a high confidence of the search engine ranking score, declining (Decline) based on high popularity of the URL domain name, and accepting (Accept) based on high similarity between the entity and URL caption.

The disclosed architecture "scrapes" (requests and receives results) a web index (e.g., entity) and mines web resource references (e.g., URLs, URIs) from the scraping results. The architecture is a pipeline that constructs queries by extracting entity names and attributes from a published entity index, and then sends the entity names and attributes to a search engine. The pipeline mines primary resource references (e.g., URLs) from the scraping results by filtering, scoring, and parsing. A primary resource reference can be selected in the mining process based on a search engine ranking score (e.g., for popularity) and domain name popularity.

The disclosed architecture can be implemented as a system, comprising: a memory device, and at least one hardware processor configured to execute computer-executable instructions stored in the memory device that enable computer-executable components, the computer-executable components comprising: an extraction component configured to extract a set of entity information from a collection of entity information, the collection of entity information derived from local search data; a distributed processing component configured to distributively query a search engine using the set of entity information and receive search results from the search engine, the search results comprising resource references; and a selection component configured to remove non-relevant resource references to obtain candidate resource references and select a top resource reference from the candidate resource references using an unsupervised machine learning algorithm.

The disclose architecture can be implemented as a method, comprising acts of: extracting useful entity information from a collection of entity information, the collection of entity information derived from local search data; distributively querying a search engine using the useful entity information and receiving search results from the search engine, the search results having resource references; removing non-relevant resource references to obtain candidate resource references; and selecting a top resource reference of a business entity from the candidate resource references using an unsupervised machine learning algorithm.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
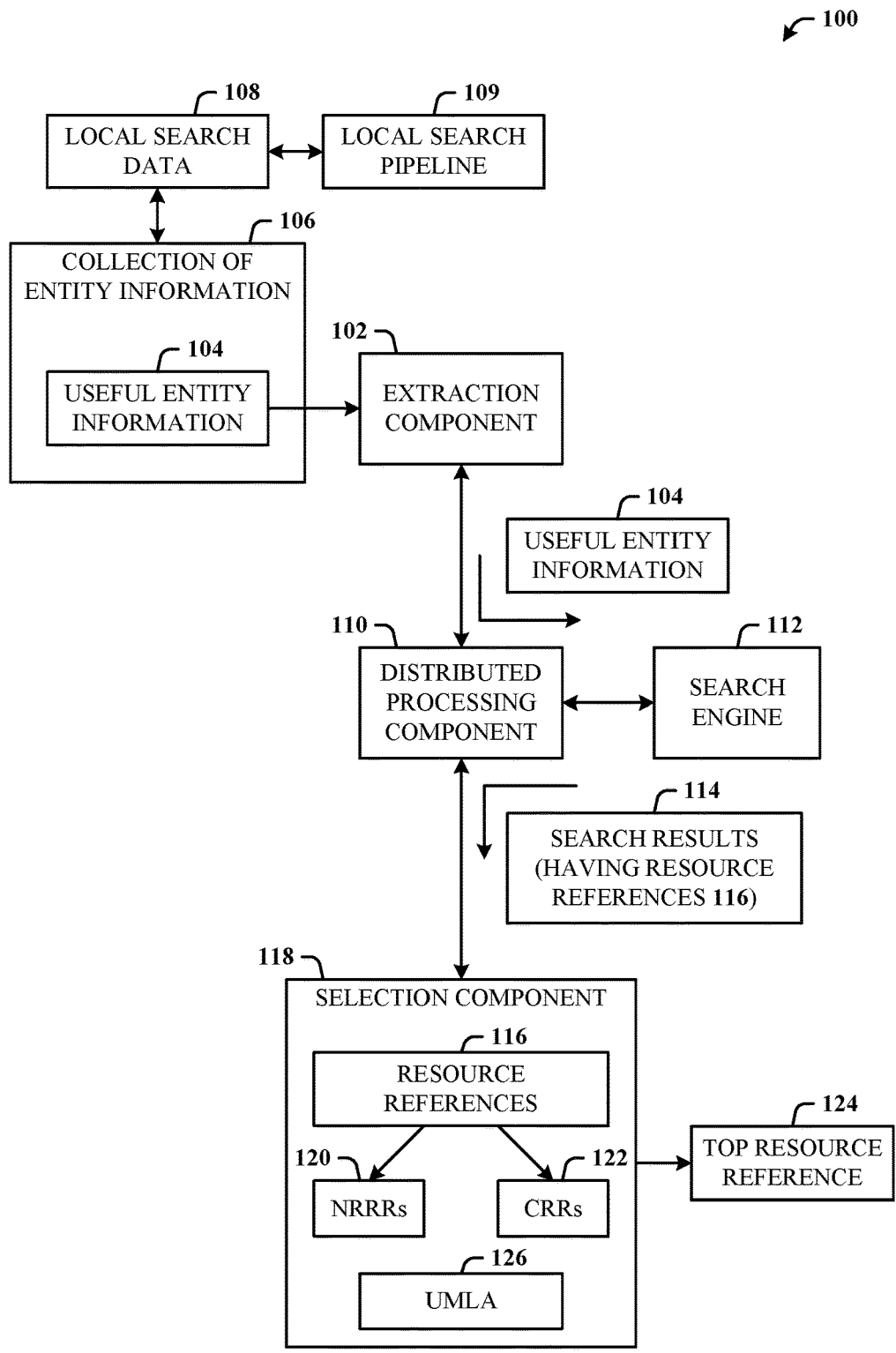
FIG. 1 illustrates a system in accordance with the disclosed architecture.

Conventional attempts at more effective searches based on URLs (uniform resource locators) have included at least a manual correction approach, a "discovery" approach, and a URL enhancement approach. The manual correction approach collects more URLs, but requires the manual fixing of the wrong URLs. The "discovery" approach mines query logs utilizing the data (e.g., search results, content, etc.) on which users clicked after searching for a local entity (i.e., "local search"—a geographically constrained search against a database or index of local entities such as businesses, points of interest, etc.). The pipeline constructs potential user queries by extracting entity name and attributes from a local search published entity index. If a match is found in the query logs, the clicked URLs are processed further for filtering and scoring, and the result is output as a URL feed. The URL enhancement approach uses query logs in a way similar to the "discovery" approach, and extracts document understanding content headers from an index for the URLs found in the query logs. This information is then used for scoring.

These existing approaches introduce a very high resource cost and are not scalable. Additionally, both the discovery and enhancement approaches rely on the query logs. Users can query for an entity, but stylize it in a way that does not match the entity name/attributes that are in a published entity index. Thus, no click data is obtained for this particular entity, and hence, no URL.

The disclosed architecture scrapes (sends requests, receives results, and stores the results) a web index (e.g., entity) and mines web resource references (e.g., URIs (uniform resource identifiers) such as URLs) from the scraping results. Although described in some cases herein in the context of URLs, it is to be understood that the description applies generally to resource references, such as URIs. The architecture is a pipeline that constructs queries by extracting entity names and attributes from a published entity index, and then sends the entity names and attributes to a search engine. The pipeline mines primary resource references (e.g., URLs) from the scraping results by filtering, scoring, and parsing. A primary resource reference can be selected in the mining process based on a search engine ranking score and domain name popularity.

Tuning can be accomplished by configuring the architecture to analyze samples based on precision and coverage parameters. These parameters can be weighted using, for example, webpage impressions (the number of times a webpage has been viewed, the webpage having a URL). Precision is based on a random sampled set of URL impressions in a given market, and coverage relates to the number of webpages (URLs) discovered in that market as compared to a coverage evaluation set for that market against which the test is run. Thus, tuning can be adjusted from high coverage and low/fair precision to fair coverage and high precision, for example, and by improving the overall score threshold from low to high. The "low" and "high" parameters can be defined as values compared to a low/high threshold. The tuning improvements can be verified by random sampling set labeling.

Additional implementations can include scraping, which processes all names for each entity, and processes all variations of names (e.g., Bellevue Home Depot™→Home Depot™). Re-ranking implies the selection of the final business entity resource reference by ranking score, URL domain name popularity, and the score equation. While one implementation, employs unsupervised machine learning, and alternative implementation can employ a supervised machine learning approach.

The disclosed architecture operates essentially on primary URLs, which is for a business/entity if it is a dedicated URL or a chain parent, and not found on an aggregator. For example, http://www.papajohns.com is a valid primary URL for a Papa John's™ store in Bellevue or Redmond. Local entities and associated surrogates, chains and containers, can establish a web presence in multiple ways: as a dedicated website for the entity to which the URL applies; as a container parent, which is a page (or sub-site) of the entity a URL applies to, on the website of a geographical container of that entity (e.g., a store page on a Mall's website); as a chain parent, which is a page (or sub-site) of the entity this URL applies to, on the website of a chain of that entity (e.g., the Bellevue Barnes & Noble™ store page at http://storelocator.barnesandnoble.com/store/1915); as an aggregator, which is a page (or sub-site) of the entity this URL applies to, on an aggregator website, such as Yelp™ or UrbanSpoon™; and, social, which is a page (or sub-site) of the entity this URL applies to, on a social networking site, such as Facebook™ or Twitter™.

The disclosed architecture can be tuned. Tuning comprises, for example, improving the output from "High coverage, low/fair precision"→fair coverage, high precision, accomplished by a threshold of confidence of the search engine ranking score changing from low→high, and the threshold of overall score changing from low→high. The tuning performance can be verified by random sampled set labeling, for example.

The disclosed architecture provides an unsupervised machine learning algorithm to filter and select URLs, and the scraping method that utilizes the web search engine. The architecture comprises two main steps in implementation. In the first main step, a first act, published data from a local search pipeline is used as input to the URL mining pipeline. In a second following act, preprocessing extracts entity useful information, which is used in a "scraping" process. In a third act of this first step, scraping is employed using a distributed scraping component. The distributed scraping component sends entity information as a query to the search engine, and, parses and saves the engine response as features (scraping results) to be used in a URL mining algorithm.

In the second main step, a first act mines business entity URLs from the above scraping results using an unsupervised machine learning algorithm. Heuristic filtering rules are initially applied to filter out invalid URLs. The filtering rules can comprise: accepting (Accept) based on a high confidence of the search engine ranking score, declining (Decline) based on high popularity of the URL domain name, and accepting (Accept) based on high similarity between the entity and URL caption.

A TF-IDF (term frequency-inverse document frequency; which reflects the statistical importance of a term to a document in a collection of documents) approach can then be applied to mine resource references such as URLs.

In a second act of this second main step, feeds are generated for evaluation. This process helps the threshold tuning in the URL mining in the first act above. In a third act, evaluation measures the precision and coverage of URL feeds, based on a measurement result. Tuning in the URL mining act above can be performed based on the measurement result. In a fourth act of this second main step, if the result of evaluation is deemed acceptable, the feed generation act generates the final URL feeds and on-boards the final URL feed into the local search pipeline. As a result, an automatic and scalable approach is provided to increase URL coverage (instances of the URLs across websites) and precision (the effective identification of the URLs using scores).

The disclosed architecture exhibits the technical effects rooted in computer technology to overcome problems specifically occurring in the realm of computer systems and networks. More specifically, the architecture enables increased processing speed by employing distributed processing of a request across components of a (web) search engine and returned results from the search engine, increased user efficiency and user experience by providing a resource reference (e.g., URL) with a higher likelihood of being correct in local search for the user than existing systems.

Reference is now made to the drawings, wherein like reference numerals are used to refer to like elements throughout. In the following description, for purposes of explanation, numerous specific details are set forth in order to provide a thorough understanding thereof. It may be evident, however, that the novel implementations can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 can include an extraction component 102 configured to extract useful (relevant) entity information 104 from a collection of entity information 106. The collection of entity information 106 is derived from local search data 108. A distributed processing component 110 is provided and configured to distributively query a search engine 112 using the useful entity information 104 and receive search results 114 from the search engine 112. Distribute querying can comprise querying a single search engine with multiple different variations of search queries. This can be enabled using multiple instances of the processing component running on correspondingly different server machines, on a single server machine, or a single instance running on or across multiple machines. The search results 114 comprise resource references 116. A selection component 118 is provided and configured to remove (e.g., filter) unwanted (non-relevant) resource references (NRRRs) 120 from the resource references 116 to obtain candidate resource references (CRRs) 122, and select a top resource reference 124 from the candidate resource references 122 (e.g., using an unsupervised machine learning algorithm 126).

The resource references 116 can be filtered (e.g., in the selection component 118) based on heuristic filtering rules related to confidence, popularity, and similarity. The extraction component 102 can be configured to receive published data from a local search pipeline 109 (associated with the local search data 108) from which to extract the relevant entity information 104. The extraction component 102 can be configured to extract useful entity information that includes business entity names and string variations on the business entity names, and entity attributes.

Figure 2:
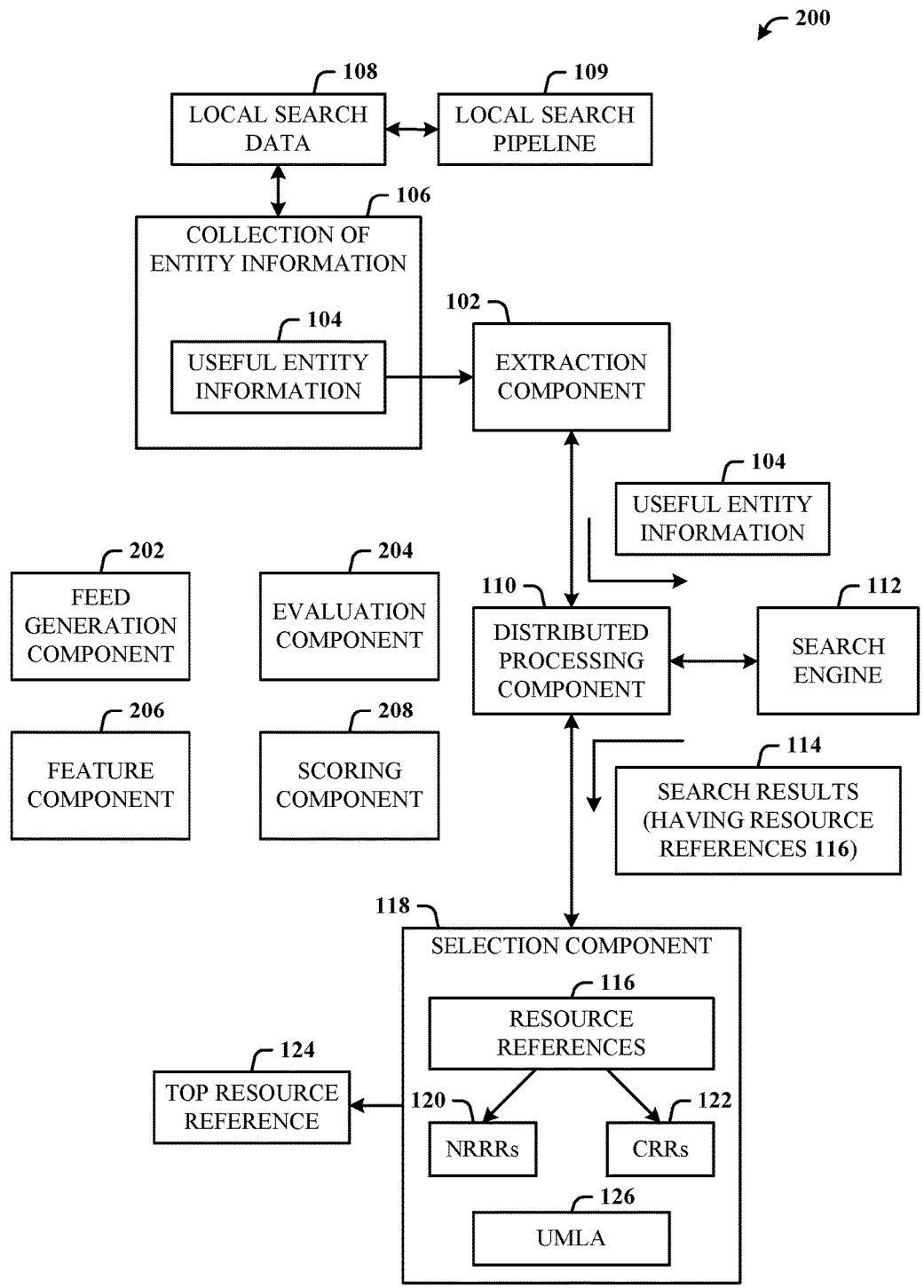
FIG. 2 illustrates an alternative system in accordance with the disclosed architecture.

FIG. 2 illustrates an alternative system 200 resources reference mining in accordance with the disclosed architecture. The system 200 includes the system 100 of FIG. 1, in addition to a feed generation component 202, an evaluation component 204, a feature component 206, and a scoring component 208.

The feed generation component 202 can be configured to generate evaluation feeds for the candidate resource references 122. Evaluation feeds are sources of information obtained from specific markets (e.g., geographical regions such as foreign countries), for example, and processed through the disclosed architecture to test for resource reference mining quality (at least in terms of coverage (values) and precision (values)) for that given market. For example, in one foreign country, a set of entities with primary URLs can be extracted, filtered, mined, and then tested for precision and coverage for tuning purposes.

The evaluation component 204 can be configured to evaluate the evaluation feeds of the candidate resource references 122 for precision and coverage of the resource references 116. The feature component 206 can be configured to parse and store search engine responses as features used in the selection of the resource references 116. The scoring component 208 can be configured to score mined URLs (a type of the resource references 116) based on a search engine ranking score and domain popularity.

The disclosed architecture finds application to other entity-based systems, such as mapping systems, where entities are searched and presented on maps. The architecture also enables the evaluation of test markets for onboarding in web search. Moreover, different evaluation sets can be employed for different problems. For example, one test set may be more applicable to a European market, while a different set may be more applicable to a regional area such as Southern California.

It is to be understood that in the disclosed architecture, certain components may be rearranged, combined, omitted, and additional components may be included. Additionally, in some implementations, all or some of the components are present on the client, while in other implementations some components may reside on a server or are provided by a local or remote service. For example, the distributed processing component 110 can host the selection component 118 or be hosted on the same machine. Similarly, the search engine 112 can comprise the distributed processing component 110 and selection component 118.

Figure 3:
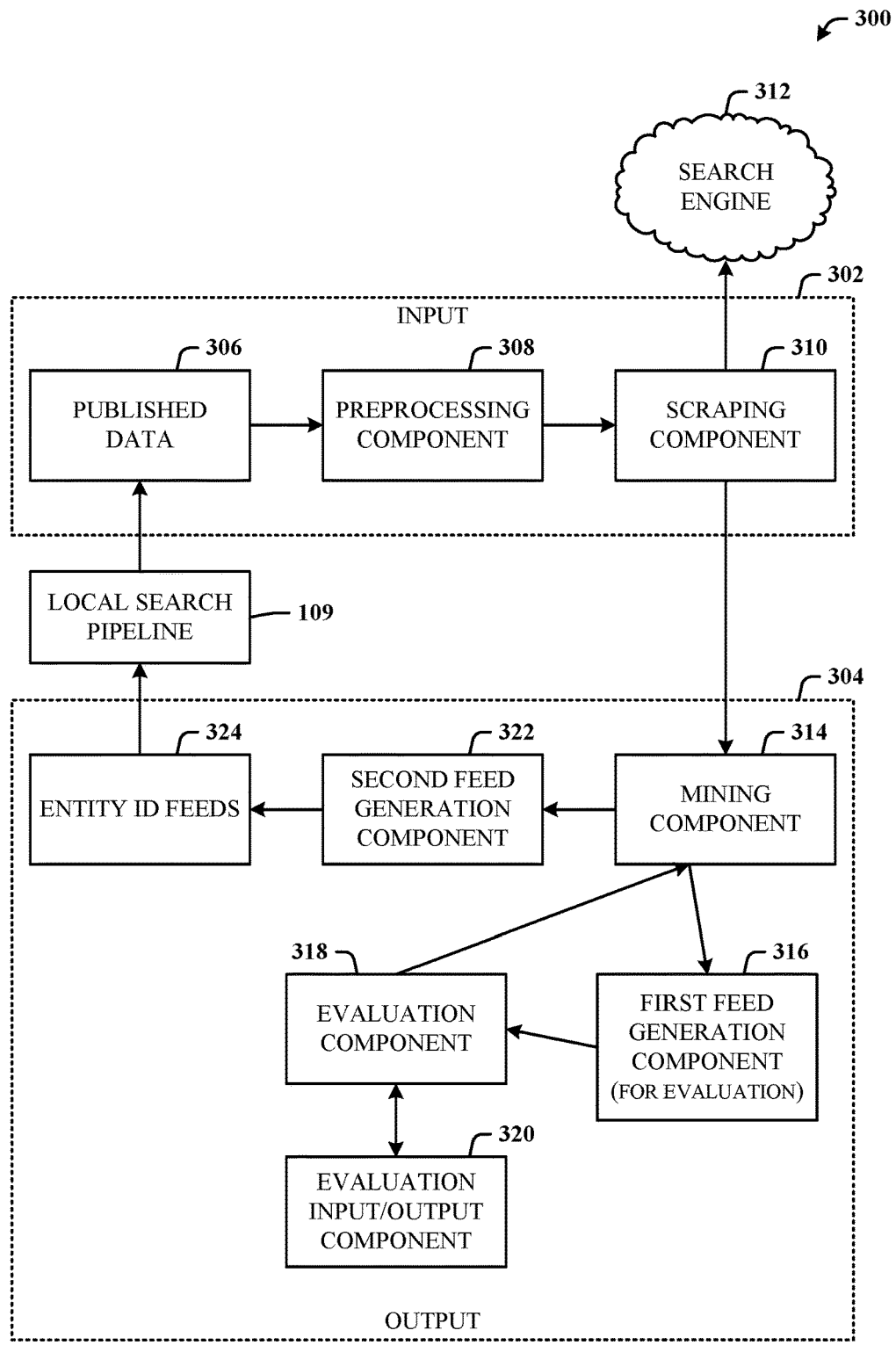
FIG. 3 illustrates an unsupervised machine learning algorithm to filter and select resource references such as URLs.

FIG. 3 illustrates an unsupervised machine learning algorithm 300 to filter and select resource references such as URLs and URI (uniform resource identifiers). Although described where the resource reference is a URL, and entities are businesses, it is to be understood that the algorithm applies as well to other resource references such as URNs (uniform resource names), etc., and to other entities, such as points of interest.

The algorithm 300 comprises two stages in implementation; an input stage (INPUT) 302 and an output stage (OUTPUT) 304. In the input stage 302, published data 306 is received from a local search pipeline and used as input to the (URL) reference resource mining pipeline, which can be described as beginning with a preprocessing component 308. The preprocessing component 308 (having functionality the same or in part to the extraction component 102) extracts useful entity information (entity attributes) from the published data 306, which entity information is used in a "scraping" process via a scraping component 310.

"Scraping" involves sending a request (query) to the search engine 312, receiving a result back, and then storing the result(s) somewhere. The scraping component 310 can be deployed in a distributed manner whereby the scraping component 310 is a distributed scraping component. The scraping component 310 comprises functionality the same or in part to the distributed processing component 110). "Distributed scraping" is accomplished using multiple servers that submit (e.g., in parallel) requests to the search engine 312, receive results back, and then aggregate the results for storage. Distributed scraping enables faster results processing than a non-distributed implementation. The distributed scraping component (e.g., scraping component 310) sends the entity information as a query to a search engine 312, and, parses and saves the response from the search engine 312 as features (scraping results) to be used in the URL mining pipeline (or algorithm).

In the output stage 304 (the URL mining stage or pipeline), the scraping results (or features) are passed to a mining component 314 configured to mine at least business entity URLs from the received scraping results. (The mining component 314 is similar to the selection component 118.) The mining operation can be performed using an unsupervised machine learning algorithm.

Heuristic filtering rules can be initially applied to filter out invalid URLs. The filtering rules can comprise, for example: Accept; where acceptance is based on a high confidence of the search engine ranking score; Decline, where a URL can be declined based on high popularity of the URL domain name; and, Accept, where acceptance is based on high similarity between the entity and URL caption.

A TF-IDF (term frequency-inverse document frequency; which represents the statistical importance of a term to a document in a collection of documents) scoring approach can then be applied to mine the URLs. The representative score can be calculated as:

$$\text{Score} = \frac{\text{search engine ranking score}}{1 + sqr(\ln(URL \text{ domain popularity}))}$$

In a first feed generation component 316 of this output stage 304, feeds are generated for evaluation analysis by an evaluation component 318. The evaluation analysis process assists threshold tuning in URL mining performed by the mining component 314. Tuning involves adjusting the threshold up or down to obtain precision resource references (URLs) returned. Evaluation measures the precision and coverage of URL feeds, based on evaluation measurement results. Tuning in the URL mining aspect of the mining component 314 can be performed based on the evaluation measurement results.

The evaluation measurement results (or a sampled set) can be output from the evaluation component 318 to an evaluation input/output (I/O) component 320. (The evaluation component 318 and the evaluation I/O component 320 comprise the same or some of the functionality of the evaluation component 204.) Alternatively, an evaluation set can be input via the evaluation I/O component 320 for evaluation analysis and threshold tuning back to the mining component 314.

If the results from the evaluation process are deemed acceptable, the mining component 314 signals a second feed generation component 322 to generate the final URL feeds 324 and input the final URL feeds into the local search pipeline. (The feed generation component 202 comprises the same or some of the functionality of the first feed generation component 316 and the second feed generation component 322.)

The mining component 314, second feed generation component 322 and entity ID feeds can be employed as online processes, which online processes are available to perform activities or services for other online requirements, and to interact with offline processes. In contrast, the evaluation component 318, first feed generation component 316, and evaluation input/output component 320 can be employed as offline processes, which do not operate to respond directly to any of the other online requirements performed by the online processes. The offline processes can communicate information and data to the online processes; however, the offline processes normally do not operate to perform activities or services directly in response to the other online requirements handled by the online processes.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
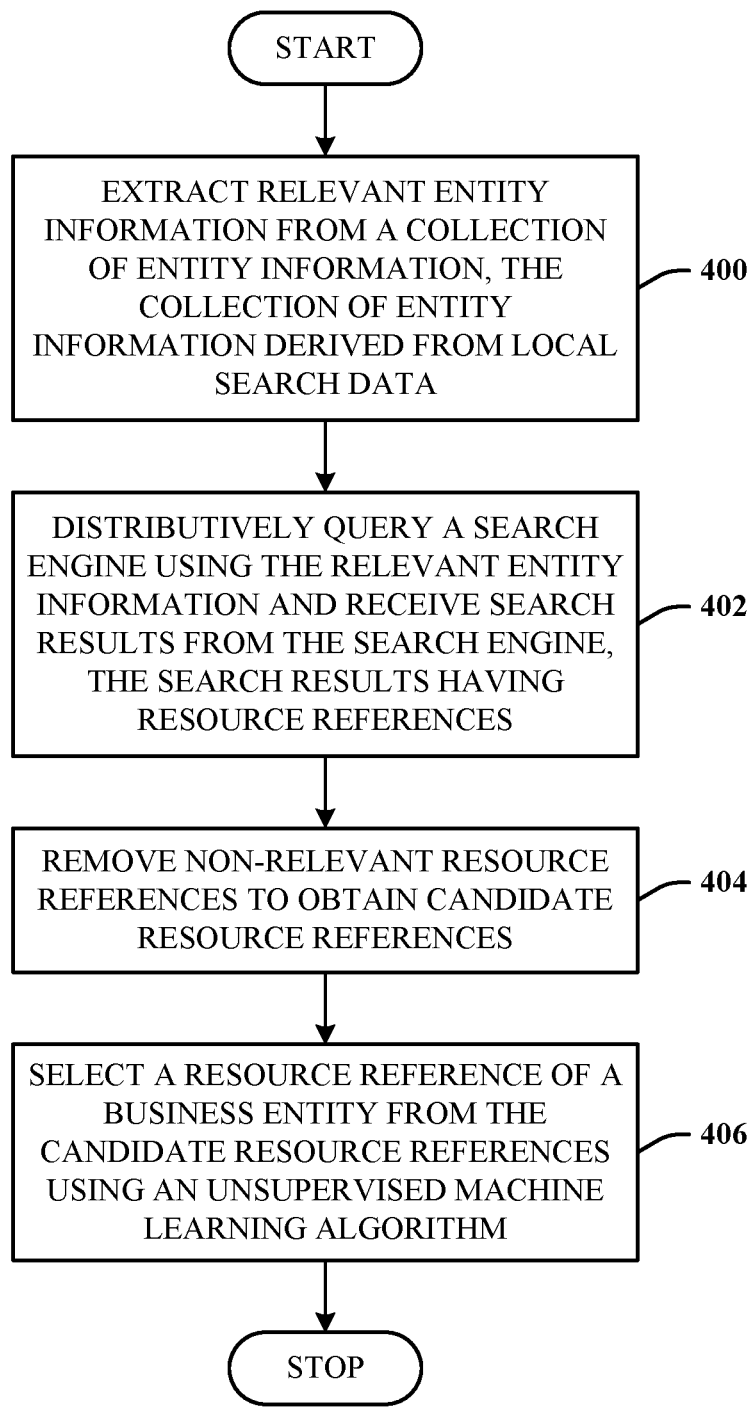
FIG. 4 illustrates a method in accordance with the disclosed architecture.

FIG. 4 illustrates a method in accordance with the disclosed architecture. At 400, relevant entity information is extracted from a collection of entity information, the collection of entity information derived from local search data. At 402, a search engine is distributively queried using the relevant entity information and search results are received from the search engine. The search results have resource references. At 404, non-relevant resource references are removed to obtain candidate resource references. At 406, a top resource reference of a business entity is selected from the candidate resource references using an unsupervised machine learning algorithm.

The method can further comprise receiving published data of a local search pipeline from which to extract the relevant entity information. The method can further comprise parsing and storing search engine responses as features used in selecting resource references.

The method can further comprise removing the non-relevant resource references based on heuristic filtering rules related to at least one of confidence, popularity, or similarity. The method can further comprise generating candidate resource reference evaluation feeds for threshold tuning. The method can further comprise evaluating the candidate resource reference evaluation feeds for precision and coverage of the resource references.

Figure 5:
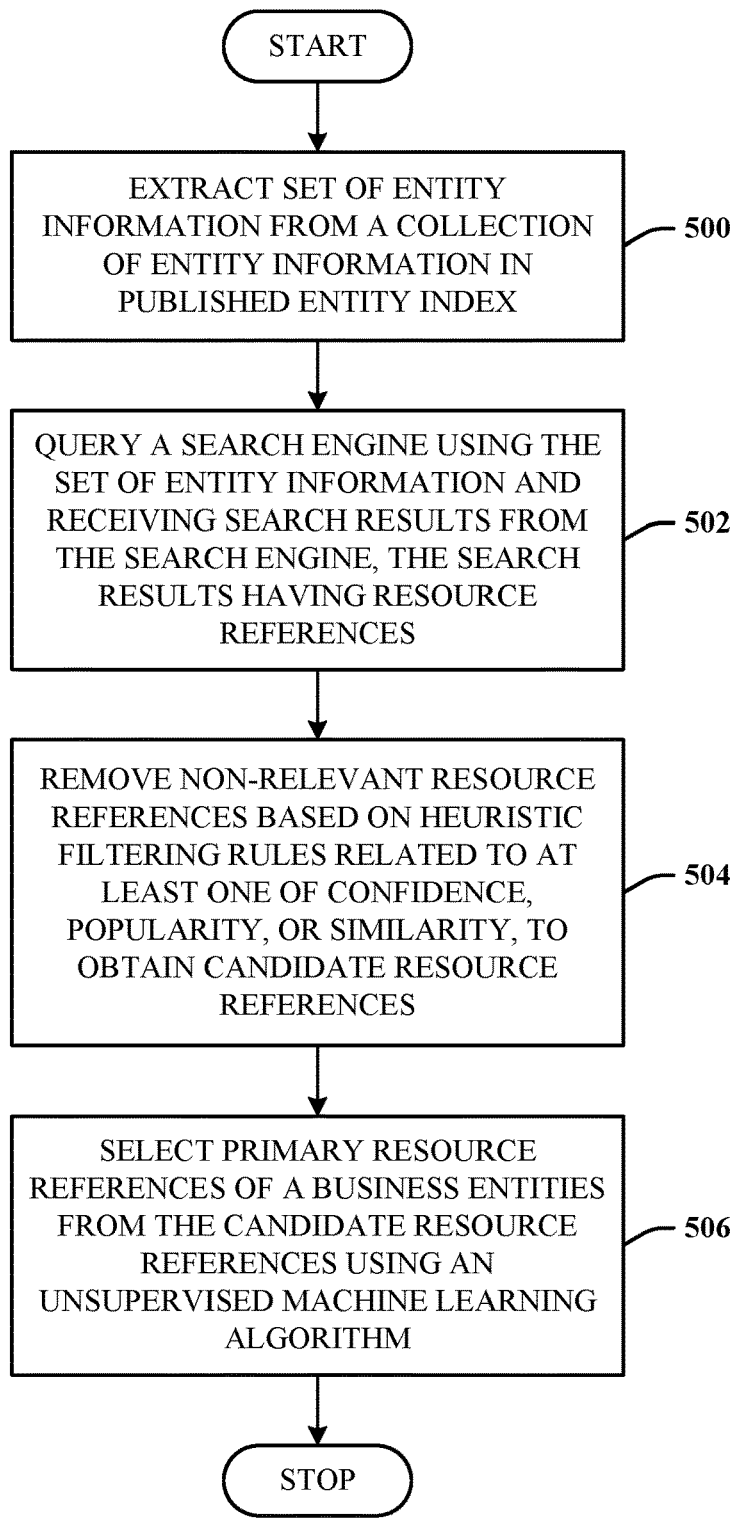
FIG. 5 illustrates an alternative method in accordance with the disclosed architecture.

FIG. 5 illustrates an alternative method in accordance with the disclosed architecture. At 500, a set of entity information is extracted from a collection of entity information in a published entity index. At 502, a search engine is distributively queried using the set of entity information and receiving search results from the search engine, the search results having resource references. At 504, non-relevant resource references are removed based on heuristic filtering rules related to at least one of confidence, popularity, or similarity, to obtain candidate resource references. At 506, primary resource references of business entities are selected from the candidate resource references using an unsupervised machine learning algorithm.

The method can further comprise parsing and storing search engine responses as entities used in selecting resource references such as uniform resource locators (URLs). The method can further comprise generating candidate resource reference evaluation feeds for tuning a threshold used in mining business entities.

The method can further comprise evaluating the candidate resource reference evaluation feeds for precision and coverage of the resource references. The method can further comprise accepting resource references based on confidence and similarity, and declining resources references based on popularity. The method can further comprise extracting useful entity information as the set of entity information, which includes business entity names and string variations on the business entity names.

As used in this application, the term "component" is intended to refer to a computer-related entity, either hardware, a combination of software and tangible physical hardware, software, or software in execution. For example, a component can be, but is not limited to, tangible components such as one or more microprocessors, chip memory, mass storage devices (e.g., optical drives, solid state drives, magnetic storage media drives, etc.), computers, and portable computing and computing-capable devices (e.g., cell phones, tablets, smart phones, etc.). Software components include processes running on a microprocessor, an object (a software entity that maintains state in variables and behavior using methods), an executable, a data structure (stored in a volatile or a non-volatile storage medium), a module (a part of a program), a thread of execution (the smallest sequence of instructions that can be managed independently), and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 6:
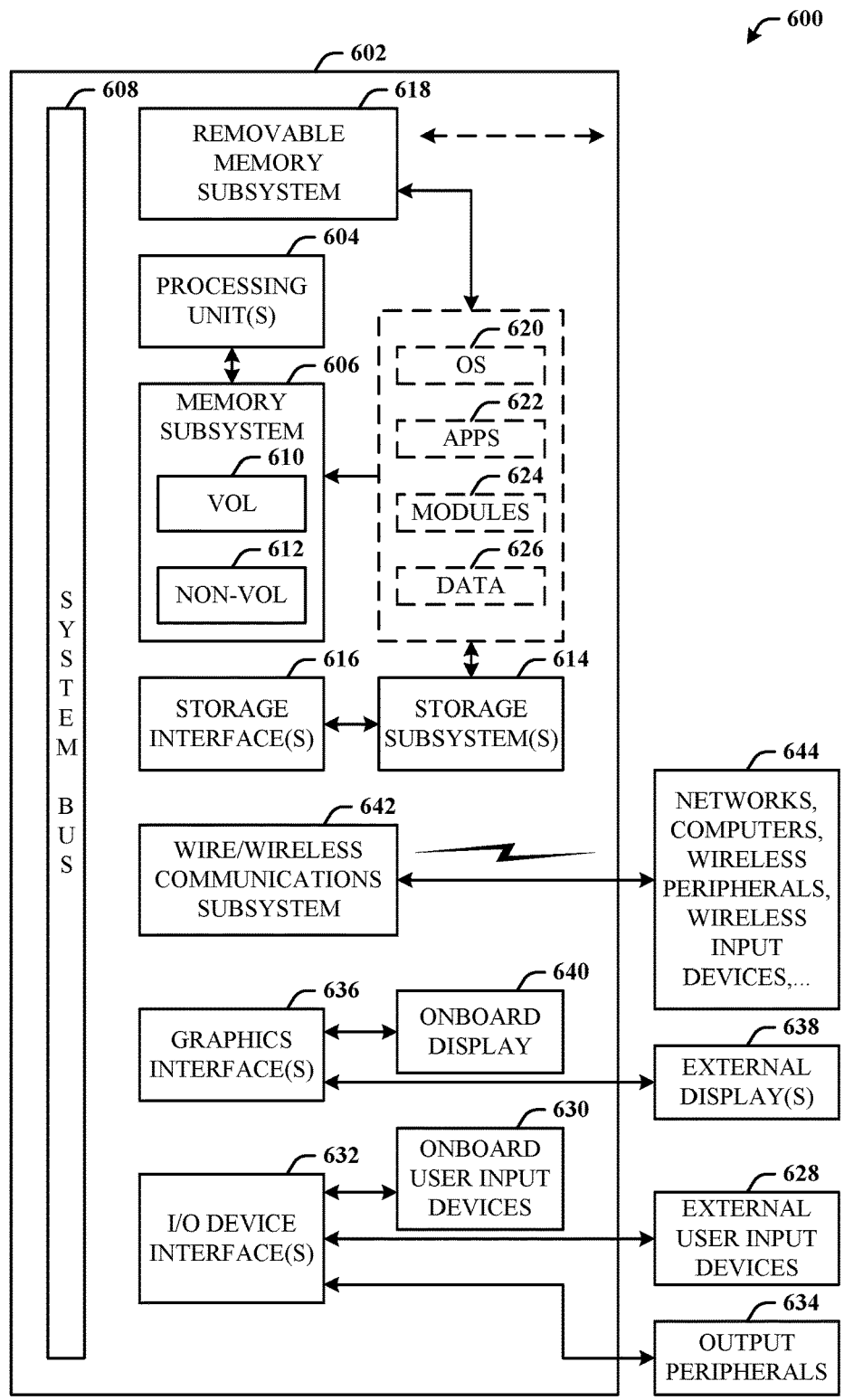
FIG. 6 illustrates a block diagram of a computing system that executes deep resource reference mining in accordance with the disclosed architecture.

Referring now to FIG. 6, there is illustrated a block diagram of a computing system 600 that executes deep resource reference mining in accordance with the disclosed architecture. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc., where analog, digital, and/or mixed signals and other functionality can be implemented in a substrate.

In order to provide additional context for various aspects thereof, FIG. 6 and the following description are intended to provide a brief, general description of the suitable computing system 600 in which the various aspects can be implemented. While the description above is in the general context of computer-executable instructions that can run on one or more computers, those skilled in the art will recognize that a novel implementation also can be realized in combination with other program modules and/or as a combination of hardware and software.

The computing system 600 for implementing various aspects includes the computer 602 having microprocessing unit(s) 604 (also referred to as microprocessor(s) and processor(s)), a computer-readable storage medium (where the medium is any physical device or material on which data can be electronically and/or optically stored and retrieved) such as a system memory 606 (computer readable storage medium/media also include magnetic disks, optical disks, solid state drives, external memory systems, and flash memory drives), and a system bus 608. The microprocessing unit(s) 604 can be any of various commercially available microprocessors such as single-processor, multi-processor, single-core units and multi-core units of processing and/or storage circuits. Moreover, those skilled in the art will appreciate that the novel system and methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 602 can be one of several computers employed in a datacenter and/or computing resources (hardware and/or software) in support of cloud computing services for portable and/or mobile computing systems such as wireless communications devices, cellular telephones, and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 606 can include computer-readable storage (physical storage) medium such as a volatile (VOL) memory 610 (e.g., random access memory (RAM)) and a non-volatile memory (NON-VOL) 612 (e.g., ROM, EPROM, EEPROM, etc.). A basic input/output system (BIOS) can be stored in the non-volatile memory 612, and includes the basic routines that facilitate the communication of data and signals between components within the computer 602, such as during startup. The volatile memory 610 can also include a high-speed RAM such as static RAM for caching data.

The system bus 608 provides an interface for system components including, but not limited to, the system memory 606 to the microprocessing unit(s) 604. The system bus 608 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 602 further includes machine readable storage subsystem(s) 614 and storage interface(s) 616 for interfacing the storage subsystem(s) 614 to the system bus 608 and other desired computer components and circuits. The storage subsystem(s) 614 (physical storage media) can include one or more of a hard disk drive (HDD), a magnetic floppy disk drive (FDD), solid state drive (SSD), flash drives, and/or optical disk storage drive (e.g., a CD-ROM drive DVD drive), for example. The storage interface(s) 616 can include interface technologies such as EIDE, ATA, SATA, and IEEE 1394, for example.

One or more programs and data can be stored in the memory subsystem 606, a machine readable and removable memory subsystem 618 (e.g., flash drive form factor technology), and/or the storage subsystem(s) 614 (e.g., optical, magnetic, solid state), including an operating system 620, one or more application programs 622, other program modules 624, and program data 626.

The operating system 620, one or more application programs 622, other program modules 624, and/or program data 626 can include items and components of the system 100 of FIG. 1, items and components of the system 200 of FIG. 2, items and components of the system 300 of FIG. 3, and the methods represented by the flowcharts of FIGS. 4 and 5, for example.

Generally, programs include routines, methods, data structures, other software components, etc., that perform particular tasks, functions, or implement particular abstract data types. All or portions of the operating system 620, applications 622, modules 624, and/or data 626 can also be cached in memory such as the volatile memory 610 and/or non-volatile memory, for example. It is to be appreciated that the disclosed architecture can be implemented with various commercially available operating systems or combinations of operating systems (e.g., as virtual machines).

The storage subsystem(s) 614 and memory subsystems (606 and 618) serve as computer readable media for volatile and non-volatile storage of data, data structures, computer-executable instructions, and so on. Such instructions, when executed by a computer or other machine, can cause the computer or other machine to perform one or more acts of a method. Computer-executable instructions comprise, for example, instructions and data which cause a general purpose computer, special purpose computer, or special purpose microprocessor device(s) to perform a certain function or group of functions. The computer executable instructions may be, for example, binaries, intermediate format instructions such as assembly language, or even source code. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed by the computer 602, and include volatile and non-volatile internal and/or external media that is removable and/or non-removable. For the computer 602, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 602, programs, and data using external user input devices 628 such as a keyboard and a mouse, as well as by voice commands facilitated by speech recognition. Other external user input devices 628 can include a microphone, an IR (infrared) remote control, a joystick, a game pad, camera recognition systems, a stylus pen, touch screen, gesture systems (e.g., eye movement, body poses such as relate to hand(s), finger(s), arm(s), head, etc.), and the like. The user can interact with the computer 602, programs, and data using onboard user input devices 630 such a touchpad, microphone, keyboard, etc., where the computer 602 is a portable computer, for example.

These and other input devices are connected to the microprocessing unit(s) 604 through input/output (I/O) device interface(s) 632 via the system bus 608, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 632 also facilitate the use of output peripherals 634 such as printers, audio devices, camera devices, and so on, such as a sound card and/or onboard audio processing capability.

One or more graphics interface(s) 636 (also commonly referred to as a graphics processing unit (GPU)) provide graphics and video signals between the computer 602 and external display(s) 638 (e.g., LCD, plasma) and/or onboard displays 640 (e.g., for portable computer). The graphics interface(s) 636 can also be manufactured as part of the computer system board.

The computer 602 can operate in a networked environment (e.g., IP-based) using logical connections via a wired/wireless communications subsystem 642 to one or more networks and/or other computers. The other computers can include workstations, servers, routers, personal computers, microprocessor-based entertainment appliances, peer devices or other common network nodes, and typically include many or all of the elements described relative to the computer 602. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 602 connects to the network via a wired/wireless communication subsystem 642 (e.g., a network interface adapter, onboard transceiver subsystem, etc.) to communicate with wired/wireless networks, wired/wireless printers, wired/wireless input devices 644, and so on. The computer 602 can include a modem or other means for establishing communications over the network. In a networked environment, programs and data relative to the computer 602 can be stored in the remote memory/storage device, as is associated with a distributed system. It will be appreciated that the network connections shown are exemplary and other means of establishing a communications link between the computers can be used.

The computer 602 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

The disclosed architecture can be implemented as a system that comprises means for extracting relevant entity information from a collection of entity information, the collection of entity information derived from local search data; means for distributively querying a search engine using the relevant entity information and receiving search results from the search engine, the search results having resource references; means for removing non-relevant resource references to obtain candidate resource references; and means for selecting a top resource reference of a business entity from the candidate resource references using an unsupervised machine learning algorithm.

The disclosed architecture can be implemented as an alternative system, comprising: means for extracting a set of entity information from a collection of entity information in published entity index; means for querying a search engine using the set of entity information and receiving search results from the search engine, the search results having resource references; means for removing non-relevant resource references based on heuristic filtering rules related to at least one of confidence, popularity, or similarity, to obtain candidate resource references; and, means for selecting primary resource references of a business entities from the candidate resource references using an unsupervised machine learning algorithm.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one hardware processor; and
   a memory device storing instructions, that when executed by the at least one hardware processor, cause the at least one hardware processor to:
   extract entity information from a first set of search results, the entity information comprising entity names and entity attributes;
   construct queries based on the entity information;
   query at least one search engine with the queries to receive a second set of search results;
   extract a set of resource references from the second set of search results; and
   provide the set of resource references to a search engine associated with the first set of search results.

2. The system of claim 1, wherein prior to providing the set of resource references to the search engine, the set of resource references are filtered based on heuristic filtering rules related to confidence, popularity, and similarity.

3. The system of claim 1, wherein the memory device stores further instructions that cause the system to receive the first set of search results from the search engine.

4. The system of claim 1, wherein the entity information further comprises string variations on the business entity names.

5. The system of claim 1, wherein the memory device stores instructions that cause the at least one hardware processor to generate evaluation feeds for the set of resource references.

6. The system of claim 1, wherein the memory device stores instructions that cause the at least one hardware processor to evaluate evaluation feeds of the set of resource references for precision and coverage of at least one resource reference in the set of resource references.

7. The system of claim 1, wherein the memory device stores instructions that cause the at least one hardware processor to parse and store the second set of search results as features, wherein the features are used in the selection of the one or more resource references.

8. The system of claim 1, wherein the memory device stores instructions that cause the at least one hardware processor to score each resource reference in the set of resource references based on a search engine ranking score and domain popularity.

9. A method, comprising:
   extracting entity information from a collection of entity information, the entity information comprising entity names, variations of entity names, and entity attributes;
   constructing queries based on the entity information;
   querying at least one search engine using the queries to receive a set of search results;
   selecting at least one resource reference from the set of search results; and
   providing the at least one resource reference to a search engine associated with the collection of entity information.

10. The method of claim 9, further comprising receiving published data of a search engine from which to extract the entity information, wherein the published data comprises the collection of entity information.

11. The method of claim 9, further comprising parsing and storing the set of search results as features used in selecting the at least one resource reference.

12. The method of claim 9, wherein the at least one resource reference is filtered based on heuristic filtering rules related to at least one of confidence, popularity, or similarity.

13. The method of claim 9, further comprising prior to selecting the at least one resource reference, generating one or more resource reference evaluation feeds for threshold tuning of the at least one resource reference.

14. The method of claim 13, further comprising evaluating the one or more resource reference evaluation feeds for precision and coverage of the at least one resource reference.

15. A method, comprising:
   extracting entity information from a published entity index, the entity information comprising entity names and attributes associated with entities;
   constructing queries based on the entity information;

querying at least one search engine using the queries to receive a set of search results from the at least one search engine, the set of search results comprising resource references;

filtering the resource references based on heuristic filtering rules related to at least one of confidence, popularity, or similarity, to obtain candidate resource references; and selecting one or more primary resource references of business entities from the candidate resource references.

16. The method of claim 15, further comprising parsing and storing the set of search results as entities used in selecting the one or more primary resource references.

17. The method of claim 15, further comprising generating candidate resource reference evaluation feeds for tuning a threshold used in mining business entities.

18. The method of claim 17, further comprising evaluating the candidate resource reference evaluation feeds for precision and coverage of the resource references.

19. The method of claim 15, wherein filtering the resource references comprises accepting resource references based on confidence and similarity and declining resources references based on popularity.

20. The method of claim 15, wherein the entity information further comprises string variations on the entity names.

* * * * *